March 2, 1965 A. E. BOULLET 3,171,450
SHINGLE CUTTING APPARATUS
Filed Jan. 29, 1962 2 Sheets-Sheet 1
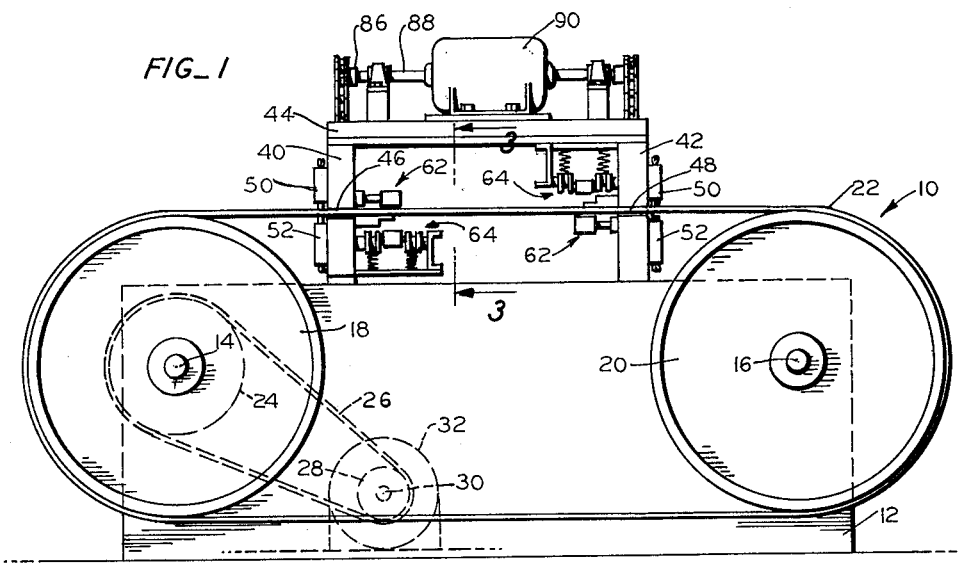
FIG_1
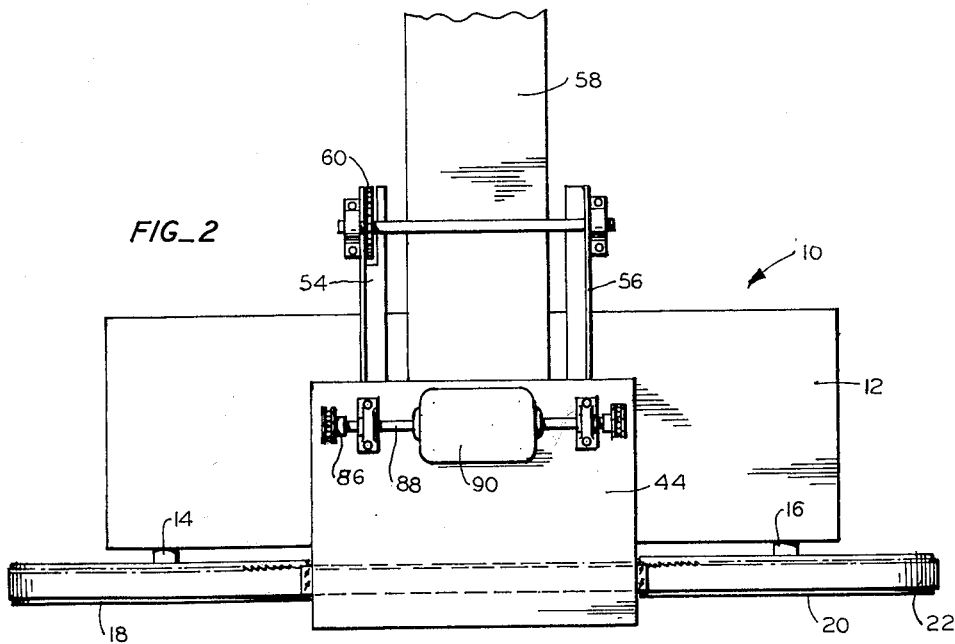
FIG_2
*INVENTOR.*
ALVIN E. BOULLET
BY
*PATENT AGENT*

March 2, 1965   A. E. BOULLET   3,171,450
SHINGLE CUTTING APPARATUS
Filed Jan. 29, 1962   2 Sheets-Sheet 2
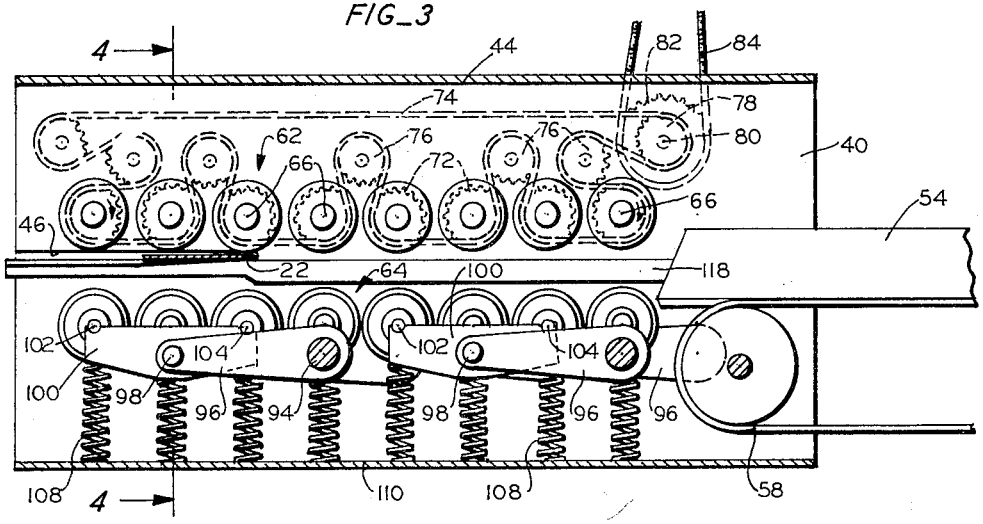
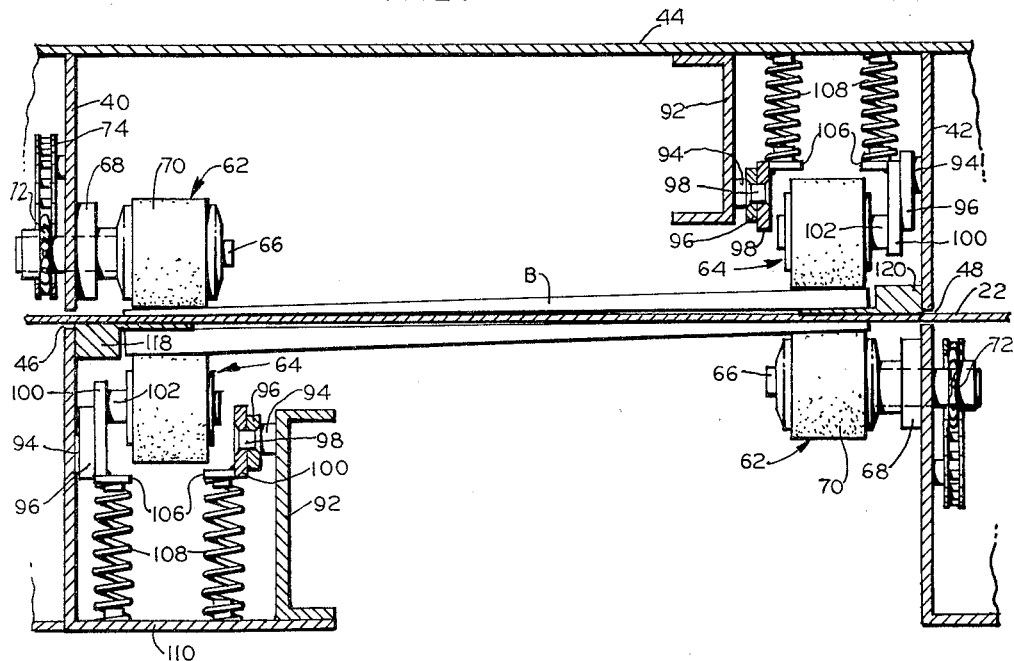
INVENTOR.
ALVIN E. BOULLET
BY
Paul B. Fike
PATENT AGENT

United States Patent Office 3,171,450
Patented Mar. 2, 1965

3,171,450
SHINGLE CUTTING APPARATUS
Alvin E. Boullet, Redwood City, Calif.
Filed Jan. 29, 1962, Ser. No. 169,481
3 Claims. (Cl. 143—5)

The present invention relates generally to shingle cutting machines, and more particularly to an apparatus that can be attached to and utilized in combination with a horizontal or vertical band saw or the like for the cutting of tapered shingles. As will become apparent hereinafter, the present invention finds its greatest utility in the cutting of the so-called "shake" shingle which type of shingle is particularly hard to handle because of the great unevenness of the exposed surfaces.

At the present time, shakes are formed in substantially the following fashion: the rough lumber is split and sawed to form a shake shingle blank, hereafter referred to merely as a "shingle blank." Such shingle blank is generally of rectangular configuration, being quite commonly 24 inches in length along the grain of the lumber and perhaps 8 inches in width. The thickness of the blank varies from one or two inches depending upon the desired thickness of the finished shingle, two of which are formed from each shingle blank. The one surface of the shingle blank is considerably uneven at one end but is formed so that the other end is more even, approaching a flat, planar surface. In turn, the other surface of the shingle blank is formed with substantially a reverse pattern, that is, the portion of this opposite surface adjacent the planar end of the other surface is considerably uneven while the remote end of this other surface approaches a flat planar conformation. The blank is cut at substantially a diagonal so that two, tapered shingles are obtained therefrom, the thin or narrowed end of each shingle being that end which has the relatively flat planar surface area.

It has been the practice, because of the uneven surface of the shingle blanks, to perform this last tapered cutting operation with the use of perhaps a power driven band saw, but with the individual shingle blank manually held to assure at least a semblance of consistency in the results. Each shingle blank varies in the amount and character of its unevenness which individual variance has defeated prior attempts to mechanically support a succession of shingle blanks and obtain consistent and properly tapered shingles. Such attempts that have been made for mechanically supporting or feeding the shingle blanks to a band saw or the like have resulted in an imperfect cut that presents an uneven cut surface rendering the subsequent laying of the shingles difficult, and moreover, frequently results in an uneven slotted configuration at the narrow tapered end of the shingle which obviously is conducive to leaks when applied as a roofing structure. Because of the inaccuracies that have inherently resulted from previous attempts to automatically feed shingle blanks to a saw, the practice of manually supporting and feeding each individual shingle blank to a saw remains in substantially exclusive use. Quite obviously, this method is not only slow, tedious and inherently inaccurate, but it renders the resultant shingle a relatively expensive item, as is well known.

Accordingly, it is a general object of the present invention to provide a shingle cutting machine and more particularly an attachment for conjoint use with a horizontal band saw or the like that enables an accurate, rapid, continuous feed of the shingle blanks to the saw whereby more perfectly formed shingles are produced, the rate of production of such shingles is expedited, and the ultimate cost of each shingle is substantially reduced.

More particularly, it is a feature of the invention to provide a shingle cutting machine wherein the shingle blanks are fed rapidly one after another in abutting relationship to the saw for continuous rapid production of the shingles.

It is an additional feature of the invention to provide a shingle cutting machine having a feeding arrangement that automatically accommodates itself to the various conformations of the shingle surface wherefore in each case, an accurate consistent tapered configuration of the resulting shingle is assured.

A further feature of the invention is the provision of a shingle cutting machine which feeds the shingle blanks laterally against the saw with a precisely controlled angular disposition such that the requisite substantially diagonal cut is made therein.

More particularly, it is a feature of the invention to provide apparatus for feeding the shingle blanks to the band saw or other cutting mechanism through the use of a plurality of rollers, some of which constitute drive rollers that are arranged to engage the shingle blanks on the relatively flat planar surface areas thereof, and others are resiliently supported idler rollers for maintaining the shingle blanks in requisite frictional contact with the drive rollers.

It is a further feature of the invention to utilize lateral guide members so as to maintain the shingle blanks in the proper disposition relative to the saw during the feeding operation.

Another feature of the invention is the provision of a trim saw which initially trims the end or ends of the shingle blank so that the same will conform closely to the preset spacing of the aforementioned guide members and will result in a consistent length of the produced shingles.

Yet a further feature of the invention is to provide for a slight spreading of the shingles immediately after severance by the band saw to thus reduce lateral forces on the shingle blank resulting from continued engagement with the saw blade.

These as well as additional objects and features of the invention will become more apparent from a perusal of the following description of the accompanying drawings wherein:

FIG. 1 is a rear elevational view of a horizontal band saw and an attachment arranged for feeding shingle blanks thereto in accordance with the present invention, FIG. 2 is a top plan view of the FIG. 1 structure, FIG. 3 is a fragmentary vertical sectional view taken substantially along lines 3—3 of FIG. 1, and FIG. 4 is a fragmentary vertical sectional view taken substantially along line 4—4 of FIG. 3.

With initial reference to FIGS. 1 and 2, the shingle cutting machine embodying the invention includes a horizontal band saw 10 including a generally rectangular frame 12 that supports horizontally projecting shafts 14, 16 at its opposite ends which, in turn, mount wheels 18, 20 that carry on their outer peripheries as endless band saw blade 22. A sprocket 24 is mounted on one shaft 14 of the band saw so that a sprocket chain 26 trained thereover and over another sprocket 28 on the shaft 30 of a suitable drive motor 32 will enable the saw blade 22 to be driven at a relatively high rate of speed. No further details of this horizontal band saw 10 need be described since it is of generally conventional nature and in and of itself forms no part of the present invention.

The attachment arranged to feed the shingle blanks into cutting engagement with the upper horizontal flight of the band saw blade 22 is suitably supported on the band saw frame 12 and may be removed if the horizontal band saw 10 is to be utilized for other purposes. More particularly, the blank-feeding attachment includes a pair of similar hollow side members 40, 42 which are secured at their lower ends by bolts or other suitable means to the top of the band saw frame 12 so as to rise vertically therefrom in spaced parallel relation. At their upper ends, the side members 40, 42 are joined by a bridging plate 44 that is rigidly connected to the side members so as to assist in the maintenance of their parallel spacing as is requisite for accurate shingle cutting, as will become more apparent hereinafter. The side members 40, 42 are provided with aligned slots 46, 48 at their rear ends to enable the band saw blade 22 to pass therethrough and blade guides 50, 52 are mounted on each of the side members 40, 42 above and below the saw blade so as to engage slidingly both upper and lower surfaces thereof to assure a precise path of travel of the saw blade between such side members, such guiding of the saw blade 22 also being of extreme importance in obtaining the required accuracy of the shingle cutting operation.

Interiorly of the side members 40, 42 and adjacent the front end thereof, a pair of guide rails 54, 56, each preferably in the form of rigid angle iron, are welded or otherwise secured so as to project from the entrance end of the shingle feeding attachment, as best illustrated in FIG. 2. The projecting guide rails 54, 56 receive therebetween the extremity of an endless conveyor 58 of any suitable type for frictionally propelling shingle blanks one after another into the apparatus, the upper flight of such conveyor being substantially at the level of the inturned horizontal flanges of the encompassing guide rails. Additionally, a conventional trim saw 60 is mounted on one of the guide rails 54 with its blade arranged vertically in alignment with the vertical flange of such mounting guide rail wherefore the shingles fed to the apparatus will be automatically trimmed, if necessary, to the requisite transverse dimension as they are fed by the conveyor 58 into the apparatus. Since both the conveyor 58 and the trim saw 60 are of conventional nature, the details of their construction need not be further described.

The inturned horizontal flanges of the guide rails 54, 46 control the level of a shingle blank entering the apparatus and the vertical flanges thereof laterally confine the shingle blanks so that the same can be moved one after another, in precisely aligned relationship into multiple series of rollers which, in accordance with the present invention, advance each shingle blank along a precisely controlled path into engagement with the cutting edge of the horizontal band saw blade 22 to thus assure the desired diagonal cut of the shingle blank and accordingly produce the requisite tapered shingles therefrom. More particularly, and with additional reference to FIGS. 3 and 4, two series of rollers 62, 64 are supported from each of the side members 40, 42 so as to engage the upper and lower surfaces of the shingle blanks adjacent the transverse extremities thereof. As can be clearly visualized by specific reference to FIG. 4, a first series of drive rollers 62 is supported on the left side member 40 so as to engage the upper surface of a shingle blank and a second series of drive rollers of similar nature and indicated by a like reference numeral is arranged for support from the other side member 42 so as to engage the under surface of a shingle blank at that end. The specific arrangement of each series of drive rollers 62 being substantially identical, only the structure of the drive rollers at the left of FIG. 4 and more particularly illustrated in FIG. 3 will be described, and it will be understood that the other series of drive rollers is similarly arranged except for its position relative to the shingle blank.

As shown best in FIG. 3, the first series of drive rollers 62 consists of eight similar rollers supported for rotation on like horizontal shafts 66 projecting in parallel and horizontally-aligned relation from the left side member 40, a suitable bearing 68 being provided for each shaft. Preferably, as shown, each roller 62 includes a roughened rubber exterior or other friction covering 70 enabling the establishment of frictional propelling relation with the surface of a shingle blank. Each roller-supporting shaft 66 carries at its outer projecting end a sprocket 72 so that an endless sprocket chain 74 may be trained about all of these sprockets, a number of intermediate idler sprockets 76 and a drive sprocket 78, so that all of the drive rollers 62 will partake of rotation in the same direction and at precisely the same speed. The drive sprocket 78 is mounted on a suitable shaft 80 that also carries a second sprocket 82 over which an endless drive chain 84 is trained. Such drive chain 84 passes upwardly around a sprocket 86 mounted on the end of the drive shaft 88 of a suitable motor 90 bolted to the bridging top plate 44 of the attachment frame. The motor drive shaft 88 extends in the opposite direction to establish similar driving connection with the drive rollers 62 supported on the opposite side member which, as previously mentioned, are similarly arranged and thus partake of like rotative speed and a direction of rotation which will advance shingle blanks toward the band saw blade 22. In the case of the drive rollers 62 on the left side member as viewed in FIG. 4, the direction of rotation obviously is clockwise, as indicated by the arrows in FIG. 3.

Since both of the described series of drive rollers 62 are maintained in their aligned dispositions, their continued engagement with the upper left side of a shingle blank and the lower right side thereof, as viewed in FIG. 4, will determine the disposition of a shingle blank as it is advanced against the saw blade 22. Several of the drive rollers 62 are positioned beyond the saw blade 22 in the direction of shingle blank advance so that the desired disposition of the shingle blank and of the two shingles formed by the cutting operation will be maintained until that time that the cutting operation has been entirely completed.

In order to hold the shingle blanks against the drive rollers 62 to assure frictional propulsion of the shingle blanks and also to maintain the disposition of such blanks, the other mentioned two series of rollers 64 are aligned, resiliently-supported, idler rollers, one series at the left of FIG. 4 engaging the undersurface of the shingle blanks so as to urge it upwardly against the drive rollers 62, and the second series shown at the right of FIG. 4 engaging the top of the shingle blank so as to urge this end downwardly against the drive rollers thereunder. As in the case of the described drive rollers 62, these two series of idler rollers 62 are of like nature and only the series shown at the left of FIG. 4 and more clearly illustrated in FIG. 3 will be described. Each series of idler rollers 64 includes eight aligned rollers, four of which are supported from the described side member 40 and the other four being similarly supported from a plate 92 extending longitudinally and in spaced relation to such side member. The side member 40 and the described parallel plate 92 each support two spaced parallel rods 94 that project inwardly a short distance and pivotally carry like arms 96 thereon. In turn, a rod 98 projects inwardly from the free end of each arm 96 to centrally pivotally support a lever 100. At one extremity of such lever 100, a stub shaft 102 projects inwardly to rotatably support one of the idler rollers 64 while a similar stub shaft 104 rotatably supports another of the idler rollers 64 at the remote end of the lever 100. Beneath each of the rollers 64, a small flange 106 is directed inwardly from the end of the lever 100 to engage one end of a coil spring 108 whose other end engages a fixed horizontally directed plate 110 forming an additional element of the frame of the device. This coil spring 108 consequently urges the engaged end of the respective lever 100 upwardly so that the roller 64 carried thereby is also urged upwardly. However, as this roller 64 and the one end of the lever 100 is urged upwardly by the one coil spring 108, the other end of the same lever 100 is urged downwardly about its central pivot, opposition of course being provided by the other coil spring 108 which is similarly arranged to urge the remote end of this same lever 100 upwardly. As a result of the described interconnection between the idler rollers 64, any engagement of one idler roller by a shingle blank which forces such roller downwardly, will at the same time urge the associated roller on the other end of the lever 100 upwardly so that it will be urged more strongly into engagement with the shingle blank. In this fashion, the unevenness encountered with shake shingle blanks can be accommodated, and continued resilient force against such shingle blank to maintain its engagement with the drive rollers 62 will be assured. Similarly, regardless of the unevenness of the surface of a shingle blank, the disposition of each shingle blank will be accurately maintained as best illustrated in FIG. 4 and indicated at B so that the desired diagonal cut by the band saw blade will be effective. Again, as in the case of the drive rollers 62, the idler rollers 64 are supported so that the aligned series thereof extends beyond the band saw blade 22.

To assure lateral confinement of each shingle blank as it passes to and past the band saw blade 22, guide members 118, 120 which in effect constitute extensions of the vertical flanges of the described guide rails 54, 56 are secured interiorly of the side members 40, 42 of the attachment frame to maintain sliding contact with the ends of the shingle blanks as they pass therebetween under the urgency of the drive rollers 62 and the simultaneous guidance by the idler rollers 64. These guide members 118, 120 carry inwardly projecting flanges adjacent the band saw blade 22 slightly beyond the cutting edge thereof in the direction of shingle blank movement. The flange at the left of FIG. 4 is immediately under the rear of the band saw blade 22 while the flange at the right is immediately above the band saw blade, and each of such flanges tapers outwardly from a very narrow front edge to a slightly wider dimension in the direction of shingle blank movement and thus serves to pass between the cut surfaces of each shingle blank B adjacent both ends thereof to reduce contact between the band saw blade 22 and the cut portions of the shingle blank to reduce frictional drag thereon. Such separation of the cut surfaces of the shingle blanks B is maintained until the tapered cut shingles are ejected from the rear or exit end of the machine.

While accuracy of feeding and cutting is assured by the described shingle feeding attachment for a horizontal band saw, it will be obvious that the shingles can be rapidly progressed therethrough, as, in fact, a rate of feeding only limited by the cutting capacity of the horizontal band saw is achieved in practice.

Obviously, various modifications and/or alterations can be made in the described structure without departing from the spirit of the invention; and accordingly, the foregoing description of one embodiment is to be considered as purely exemplary and not in a limiting sense; the scope of the invention is to be indicated only by reference to the appended claims.

What is claimed is:

1. A shingle cutting machine which comprises a saw supported for operation in a predetermined cutting plane, and means for feeding a shingle blank laterally along a predetermined path against said saw, said feeding means being arranged to support the shingle blank in angular disposition with its ends at the opposite sides of said predetermined path and disposed respectively above and below said predetermined cutting plane whereby a diagonally-extending cut is made through the shingle blank, said feeding means including a first series of drive rollers adapted to engage the shingle blank on one surface adjacent one end thereof, a second series of drive rollers adapted to engage the shingle blank on the opposite surface adjacent the opposite end thereof, and means resiliently mounted to urge the shingle blank against both series of drive rollers.

2. A shingle cutting machine according to claim 1 wherein said shingle blank urging means includes at least one pair of idler rollers aligned in the direction of movement of a shingle blank toward said saw, individual spring means resiliently urging each of said rollers toward the path of shingle blank movement, and means pivotally interconnecting said idler rollers whereby displacement of one of said rollers away from the path of shingle blank movement effects increased resilient force on said other idler roller toward the path of shingle movement.

3. An attachment for a horizontal band saw to enable shingle cutting which attachment comprises means including a plurality of rollers adapted to movably engage the upper and lower surfaces of a shingle blank adjacent opposite ends thereof and define a path of shingle blank motion angularly disposed relative to the plane of said band saw, and means for driving said rollers above the shingle blank at one end thereof and below the shingle blank at the other end thereof for moving the shingle blank toward said band saw.

References Cited in the file of this patent

UNITED STATES PATENTS

| | | |
|---|---|---|
| 534,173 | Pugh | Feb. 12, 1895 |
| 624,753 | Clubb | May 9, 1899 |
| 679,085 | Linton | July 23, 1901 |
| 1,062,484 | Lincoln | May 20, 1913 |
| 1,976,171 | Hutchings | Oct. 9, 1934 |
| 2,304,470 | Marshall et al. | Dec. 8, 1942 |
| 2,440,994 | Wilde | May 4, 1948 |
| 3,079,961 | Starke | Mar. 5, 1963 |